(12) United States Patent
Wyatt et al.

(10) Patent No.: US 7,665,082 B2
(45) Date of Patent: Feb. 16, 2010

(54) METHODS AND SYSTEMS FOR ADAPTATION, DIAGNOSIS, OPTIMIZATION, AND PRESCRIPTION TECHNOLOGY FOR NETWORK-BASED APPLICATIONS

(75) Inventors: Douglas K. Wyatt, Los Altos, CA (US); Barry Hayes, Palo Alto, CA (US); Scott McGregor, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 09/893,749

(22) Filed: Jun. 29, 2001

(65) Prior Publication Data

US 2002/0013833 A1      Jan. 31, 2002

Related U.S. Application Data

(60) Provisional application No. 60/215,321, filed on Jun. 30, 2000.

(51) Int. Cl.
*G06F 9/44* (2006.01)
*G06F 9/445* (2006.01)

(52) U.S. Cl. .................. 717/171; 717/168; 717/174; 717/176

(58) Field of Classification Search .................. 717/151, 717/120, 153, 168–178; 709/222, 221
See application file for complete search history.

(56) References Cited

U.S. PATENT DOCUMENTS

| | | | | |
|---|---|---|---|---|
| 5,421,009 A | * | 5/1995 | Platt | 709/221 |
| 5,579,511 A | * | 11/1996 | Cavasa et al. | 703/27 |
| 5,800,473 A | * | 9/1998 | Faisandier | 607/59 |
| 5,845,077 A | | 12/1998 | Fawcett | |
| 6,029,196 A | * | 2/2000 | Lenz | 709/221 |
| 6,059,842 A | * | 5/2000 | Dumarot et al. | 717/153 |
| 6,074,434 A | | 6/2000 | Cole et al. | |
| 6,139,177 A | * | 10/2000 | Venkatraman et al. | 700/83 |
| 6,151,599 A | * | 11/2000 | Shrader et al. | 707/9 |

(Continued)

FOREIGN PATENT DOCUMENTS

EP      0 811 942      12/1997
JP      13-04-98       10/1999

OTHER PUBLICATIONS http://groups.google.com/groups?q=JavaScript+to+determine+support+for+Java&start=10&hl=en&lr=&ie=UTF-8&selm=5ijibt%24333%40boursy.news.erols.com&rnum=11.*

*Primary Examiner*—Jason Mitchell
(74) *Attorney, Agent, or Firm*—Perkins Coie LLP

(57) ABSTRACT

The present invention adapts, diagnoses, optimizes, and prescribes a network-based application between a client and a host system. Some or all components of the network-based application, including configuration information may be installed on the client. The components and configuration information may be installed as the network-based application is executed. Alternatively, the components and configuration information may be installed in advance of the network-based application. To launch the network-based application, a user via the client sends an application request to the host system. The host system sends program code to the client. Upon executing the program code, the client attempts to establish a session with the host system and determines configuration information for the network-based application. Upon establishing the session and determining the configuration information, the client then launches the network-based application.

17 Claims, 5 Drawing Sheets

U.S. PATENT DOCUMENTS

| | | | |
|---|---|---|---|
| 6,167,567 A * | 12/2000 | Chiles et al. | 717/173 |
| 6,219,659 B1 * | 4/2001 | Kliorin | 706/47 |
| 6,279,030 B1 * | 8/2001 | Britton et al. | 709/203 |
| 6,282,711 B1 * | 8/2001 | Halpern et al. | 717/175 |
| 6,324,578 B1 * | 11/2001 | Cox et al. | 709/223 |
| 6,385,497 B1 * | 5/2002 | Ogushi et al. | 700/110 |
| 6,449,642 B2 * | 9/2002 | Bourke-Dunphy et al. | 709/222 |
| 6,477,550 B1 * | 11/2002 | Balasubramaniam et al. | 715/513 |
| 6,493,871 B1 * | 12/2002 | McGuire et al. | 717/173 |
| 6,510,466 B1 * | 1/2003 | Cox et al. | 709/229 |
| 6,546,554 B1 * | 4/2003 | Schmidt et al. | 717/176 |
| 7,130,701 B1 * | 10/2006 | Wischinski | 700/65 |

* cited by examiner

METHODS AND SYSTEMS FOR ADAPTATION, DIAGNOSIS, OPTIMIZATION, AND PRESCRIPTION TECHNOLOGY FOR NETWORK-BASED APPLICATIONS

REFERENCE TO RELATED APPLICATIONS

This application claims priority from co-pending prior provisional application Ser. No. 60/215,321, filed Jun. 30, 2000 for "METHODS AND SYSTEMS FOR ADAPTATION, DIAGNOSIS, OPTIMIZATION, AND PRESCRIPTION TECHNOLOGY FOR NETWORK-BASED APPLICATIONS."

FIELD OF THE INVENTION

This invention relates to network based applications. More particularly, it relates to adapting, diagnosing, optimizing, and prescribing network-based applications.

BACKGROUND OF THE INVENTION

Recently, network-based applications over a network, such as the Internet, to communicate and share data have become popular. Network-based applications allow users to connect to each other over a network, such as the Internet. For example, network-based applications such as online conferencing, and application sharing, have become popular with businesses and organizations.

However, such network-based applications, in general, are not fully installed on a user's computer. The user must often download and configure some or all of the components for a network-based application. Unfortunately, downloading and configuring a network-based application can be a difficult process. For example, the hardware configuration, and operating system of a user's computer can affect the performance of a network-based application. The web browser, its settings, the network path between the client and one or more servers and security devices such as firewalls may also affect the execution of a network-based application. Therefore, due to the numerous factors involved, optimizing a network application can be difficult and complex.

Unfortunately, due to the complexity and difficulty, performance of the network-based application can be degraded, for example, slow response times. In addition, problems in a network-based application can be difficult to diagnose and fix. Therefore, there is a need for methods and systems for adapting, diagnosing, optimizing, and prescribing network-based applications.

SUMMARY OF THE INVENTION

To overcome these and other shortcomings, methods and systems are provided for adapting, diagnosing, optimizing, and prescribing network-based applications. In accordance with the principles of the present invention, a network-based application may be customized, adapted, and/or tailored at a user's machine and at servers used during the application's execution to optimize the user's experience.

In accordance with an embodiment of the present invention, a method for optimizing an application served from a server to a client across a network comprises: providing a first code segment to a client; determining a plurality of parameters for an execution environment of the application based on the first code segment; providing the determined plurality of parameters for the execution environment of the application to the server; and determining a second code segment for configuring the application based on the plurality of parameters.

In accordance with another embodiment of the present invention, a client for a network-based application comprises: means for receiving a request to launch an application; means for determining a plurality of parameters for the execution environment of the application; means for providing the determined plurality of parameters for the execution environment of the application; and means for configuring the application based on the determined plurality of parameters for the execution environment.

In accordance with yet another embodiment of the present invention, a server for a network-based application comprises: means for receiving a request to launch an application; means for providing first code to determine an execution environment of the application; means for receiving a plurality of parameters for the execution environment of the application determined based on the first code; and means for determining second code for configuring the application based on the plurality of determined parameters.

In accordance with the principles of the present invention, problems or other circumstances that might negatively impact the user's experience with the application may be diagnosed. For example, problems which may be addressed with the present invention include: network performance issues; user hardware configuration issues; user software interface issues such as browser configuration issues; firewalls; and application proxies. Possible remedies may also develop in accordance with the principles of the present invention.

Special security permissions and other user decisions that will be required in initializing, configuring, or using the application may also be minimized. The present invention allows for aiding in the eventual delivery of customer service or technical support to the user, if required, by detecting application failures by proactively providing the user with support information, such as email addresses, phone numbers, fax numbers, etc. Furthermore, the present invention provides for gathering and aggregating the information to enable improvement of the network-based application.

Additional benefits and advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the figures.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts.

In accordance with the principles of the present invention, network-based applications such as online conferences, online meetings, web seminars, and application sharing applications may be adapted, diagnosed, optimized, and prescribed based upon conditions associated with a client and a host system. Some or all components of a network-based application, including configuration information, may be previously installed on a client. Alternatively, the components and configuration information may be concurrently installed on the client as a network-based application is executing.

In accordance with the principles of the present invention, a user may launch a network-based application. To launch the network-based application, a user via a client sends an application request to a host system. The host system sends program code to the client. In operation, the client establishes a session with the host system and determines configuration information for the network-based application. Upon establishing the session and determining the configuration information, the client launches the network-based application.

Figure 1:
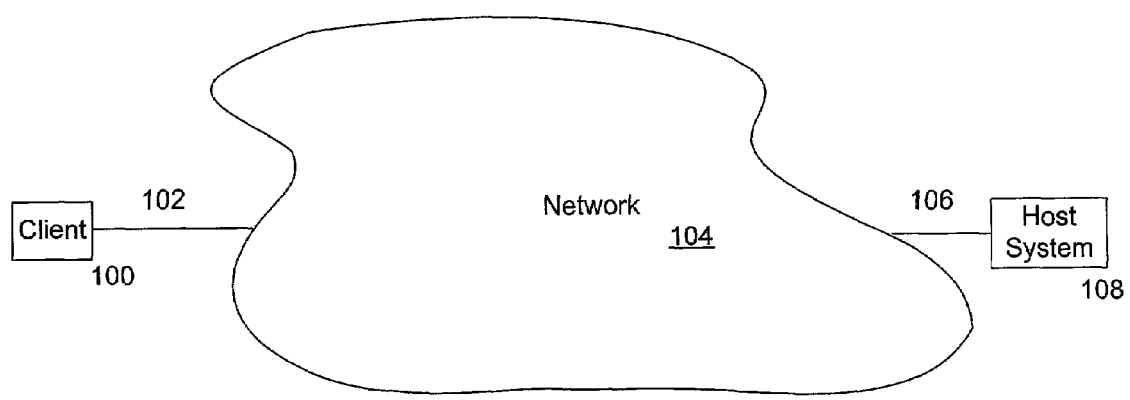
FIG. 1 illustrates an overall architecture for a network-based application consistent with the principles of the present invention.

FIG. 1 illustrates an overall architecture for a network-based application consistent with the principles of the present invention. In particular, a client 100, a network 104, and a host system 108 are shown. Client 100 allows a user to access the network-based application served by host system 108 via network 104. Client 100 may be implemented using a combination of hardware and software to execute a network-based application. For example, client 100 may be implemented as a personal computer running Windows NT, Macintosh OS, or Unix. Client 100 may also be implemented as other devices such as, a personal digital assistant, a laptop, a web-enabled mobile phone, etc. Any type of device which can access network 104 is within the principles of the present invention.

Client 100 is coupled to network 104 via a connection 102. Connection 102 may be implemented using a wide variety of technologies including: dedicated wireline connections; dial-up connections; digital subscriber line; and cable. In addition, connection 102 may be implemented using wireless technologies including: HomeRF™ and Bluetooth™. Connection 102 may also include application proxies, network elements such as routers, switches, and hubs, firewalls and other network security devices. Network 104 provides connectivity between client 100 and host system 108. Network 104 may comprise various nodes (not shown) which route communications between client 100 and host system 108. In one embodiment, network 104 comprises the Internet. However, any network which provides connectivity between client 100 and host system 108 for a network-based application is within the scope of the present invention. Alternatively, client 100 and host system 108 may be connected directly without a network.

Connection 106 provides connectivity between network 104 and host system 108. Connection 106 may be implemented using a wide variety of technologies including: dedicated wireline connections; digital subscriber line; and cable. Connection 106 may also include application proxies, network elements such as routers, switches, and hubs, firewalls and other network security devices.

Host system 108 is a combination of hardware and software to provide application content and program code for a network-based application. Host system 108 may be implemented using one or more devices, e.g., servers, network elements, etc. The one or more devices within host system 108 may run, for example, on Windows NT, Linux, and Unix. In addition, host system 108 may be implemented at a single location or at a plurality of locations which are coupled together across a network such as network 104. Host system 108 provides application content and program code for applications such as online conferences, online meetings, web seminars and application sharing. In general, host system 108 provides application content and program code upon request from client 100. Host system 108 then may load the requested application content or program code from a location specified by URL and provide the application content and program code across network 104 to client 100. The exchange between host system 108 and client 100 may be mediated using hypertext transport protocol (HTTP) and the application content may be provided using markup languages, such as, hypertext markup language (HTML). In addition, content and program code for the application may be embedded directly or indirectly, e.g., by reference, within HTML and may use technologies such as Java, JavaScript, Java server pages (JSP), Perl, C/C++, active server pages (ASP), ActiveX, and common gateway interface (CGI).

Figure 2:
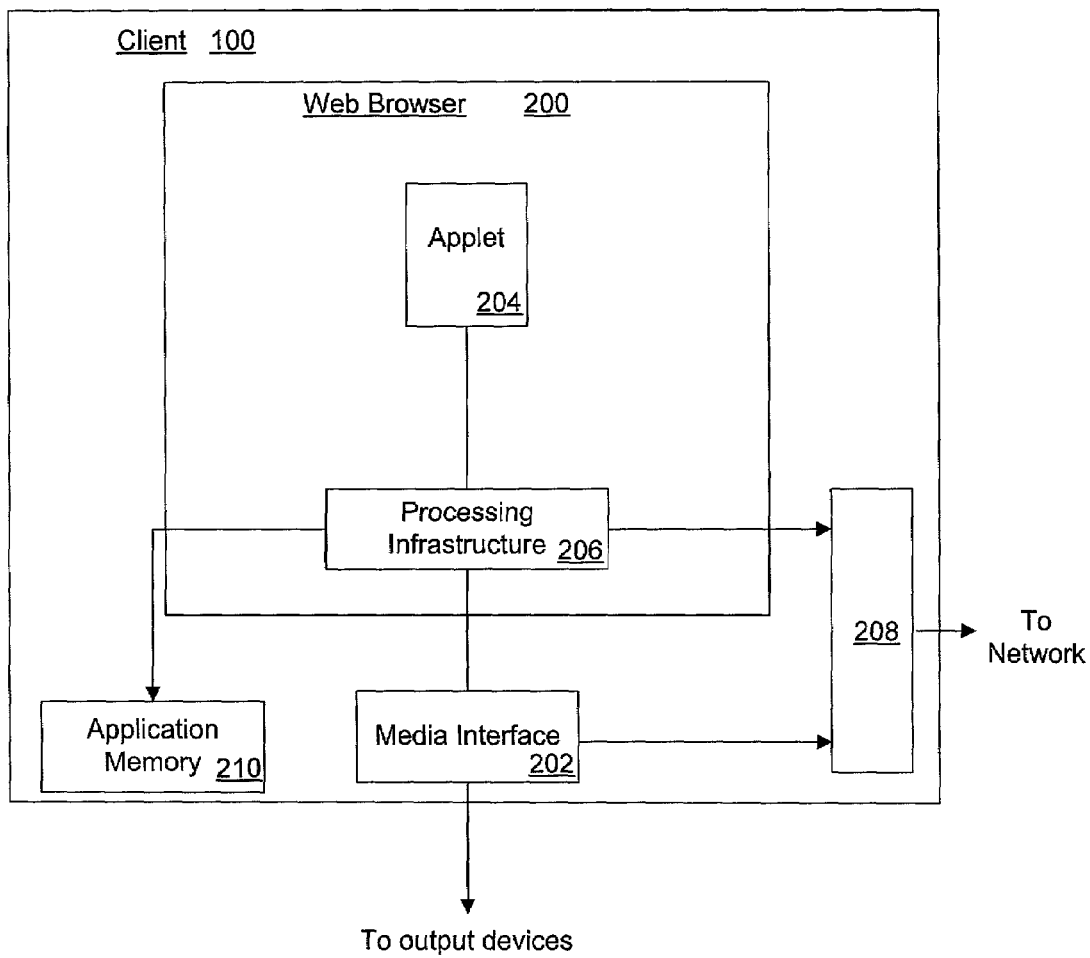
FIG. 2 shows a more detailed view of a client configured in a manner consistent with the principles of the present invention.

FIG. 2 shows a more detailed view of client 100 configured in a manner consistent with the principles of the present invention. As shown in FIG. 2, client 100 includes a web browser 200, a media interface 202, a network interface 208, and an application memory 210. Web browser 200 may be implemented as a software application to allow the user to view application content and execute application program code. Web browser 200 may include an environment for executing an applet 204, a program supporting the application received from host system 108 (e.g., using an applet tag embedded in an HTML document to execute Java code), and a processing infrastructure 206. Applet 204 may be previously installed or installed concurrently with the execution of the application. Although one applet is shown, web browser 200 may include multiple applets for various Java programs distributed from host system 108.

Processing infrastructure 206 coordinates processing activity and communications between media interface 202, applet 204, network interface 208 and application memory 210. Processing infrastructure 206 may be implemented to include software such as an HTML engine, a JavaScript engine, and a Java virtual machine. However, processing infrastructure 206 may include a wide variety of software or hardware in accordance with the principles of the present invention. In operation, processing infrastructure 206 handles communications, e.g., between web browser 200 and host system 108, and processing for the application. When a user operates client 100 to launch the application, processing infrastructure 206 may mediate communications between web browser 200 and host system 108 (e.g., via web server 304, shown in FIG. 3) using HTTP and TCP. Processing infrastructure 206 may also manage a user datagram protocol ("UDP") or a real-time protocol ("RTP") connection for audio/visual content such as streaming video and audio associated with the application. Processing infrastructure 206 uses network interface 208 to direct communications across network 104. Network interface 208 may be implemented as a local area network interface (e.g., an Ethernet interface), or a modem. However, any type of network interface may be used within the scope of the present invention. Processing infrastructure 206 may also interface with application memory 210 to store and access components for the application. Application memory 210 may be implemented using a combination of hardware and software such as hard disk, compact disk, diskette, and RAM.

As shown in FIG. 2, media interface 202 provides an interface between processing infrastructure 206 and the user (not shown) for the application executing on client 100. Media interface 202 may provide application content to/from devices such as a speaker, a display, a microphone and a camera.

Figure 3:
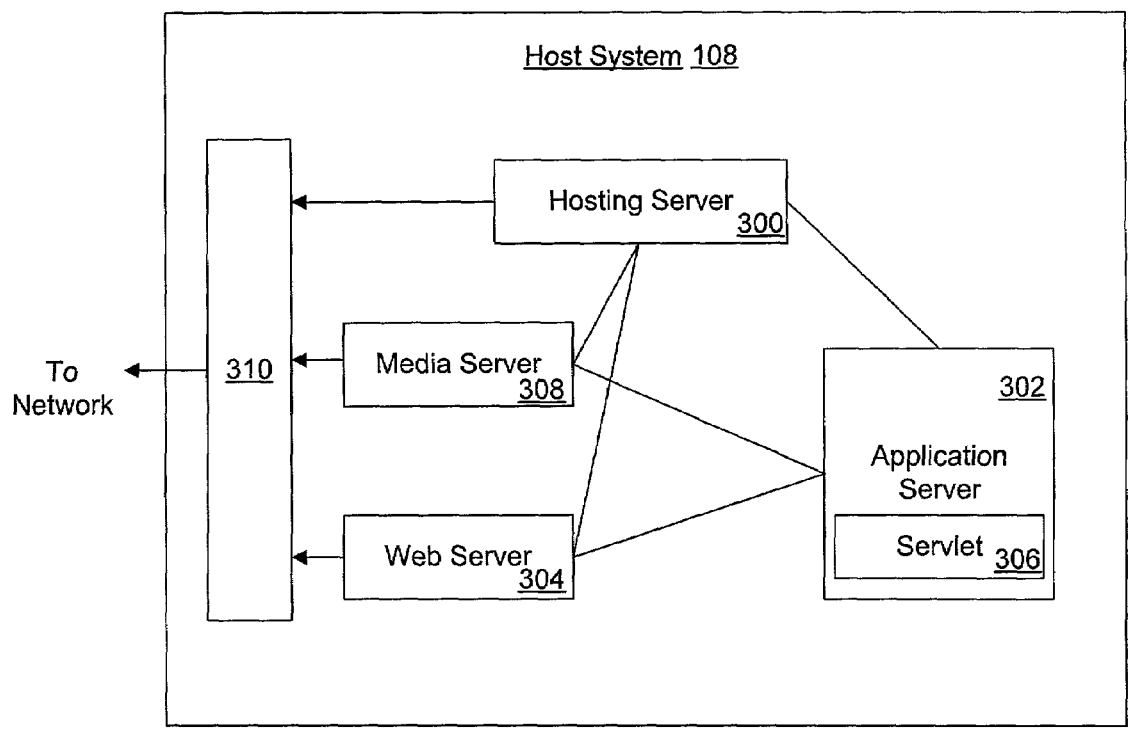
FIG. 3 shows a more detailed view of a server host configured in a manner consistent with the principles of the present invention.

FIG. 3 shows a more detailed view of host system 108 configured in a manner consistent with the principles of the present invention. As shown, host system 108 comprises a hosting server 300, an application server 302, a web server 304, a media server 308, and a network interface 310. Although a single host system is shown in FIG. 3, host system may be implemented using several hosts and/or servers in accordance with the principles of the present invention. Other implementations for host system 108 are also within the principles of the present invention.

Hosting server 300 provides content and program code for the application. Hosting server 300 may be implemented as a server for applications including online meetings, online conferences, web seminars and application sharing such as those supported by PLACEWARE™. In operation, hosting server 300 responds to communications from client 100 at a particular port designated for hosting server 300. Hosting server 300 may respond to HTTP requests or TCP connections either directly or via a forwarding service, process the HTTP request or TCP connection, and work in conjunction with network interface 310 to send responses across network 104 to client 100.

Application server 302 and web server 304 provide content and program code for the application to launch the application and establish communications between client 100 and hosting server 300. Upon receiving an HTTP request, web server 304 may process URLs in an HTTP request directly. In addition, web server 304 may forward URLs to application server 302. The URLs may identify files located within host system 108, files remote from host system 108 which may be retrieved across network 104, or files locally installed on client 100. As shown in FIG. 3, application server 302 may include a servlet 306. Application server 302 may utilize servlet 306 to process an HTTP request. Alternatively, application server 302 may utilize a CGI script to process a forwarded HTTP request from web server 304. After processing the HTTP request, application server 302 sends a response via web server 304. Servlet 306 and applet 204 (running on client 100) allow host system 108 and client 100 to be extended in a modular way by dynamically loading content and program code for the application. Although one servlet is shown, application server 302 may include multiple servlets for various Java programs for supporting and implementing the application.

Media server 308 provides media specific audio/visual content associated with the application to client 100 via media interface 202. For example, the audio/visual content may include live video and audio, visual presentations via streaming video and audio.

Network interface 310 handles and directs communications across network 104 between host system 108 and client 100. Network interface 310 may be implemented as a router, hub or switch. In addition, network interface 310 may be implemented in combination with other devices for security purposes such as a firewall.

Figure 4A:
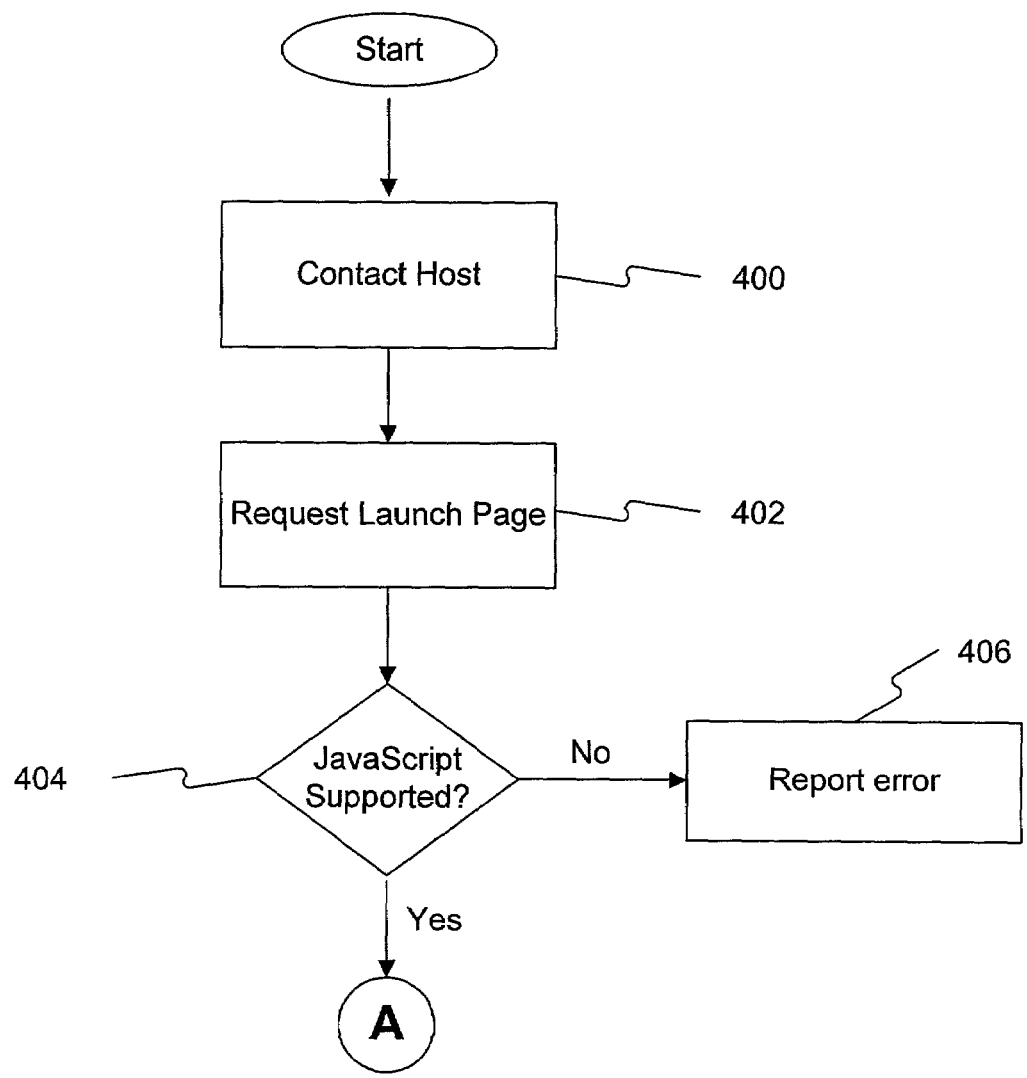
FIGS. 4a and 4b show a method for processing, adapting, diagnosing, optimizing, and prescribing network-based applications consistent with the principles of the present invention.
Figure 4B:
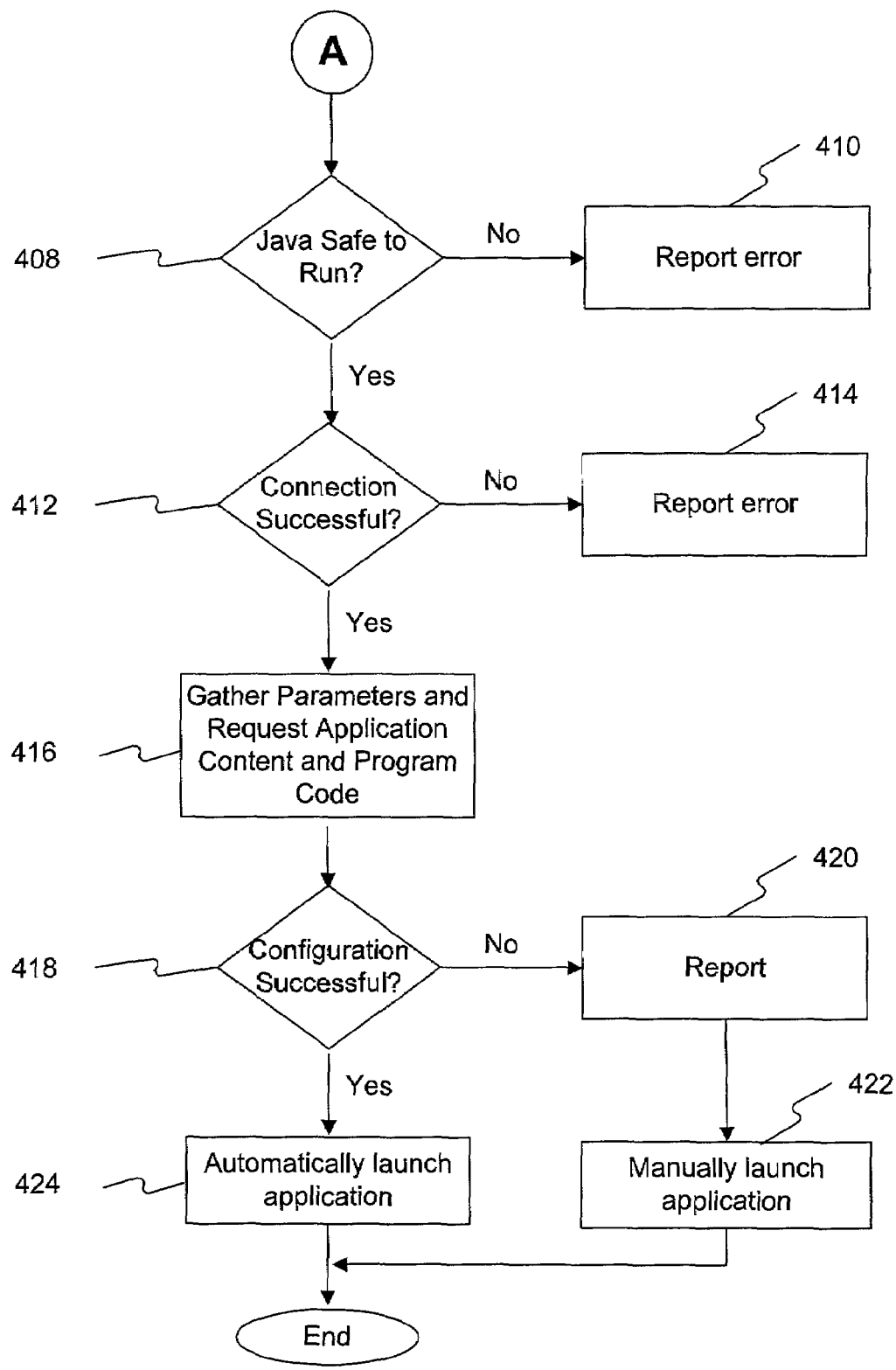

FIGS. 4a and 4b show a method for processing adapting, diagnosing, optimizing, and prescribing network-based applications consistent with the principles of the present invention. In step 400, client 100 contacts host system 108, e.g., in response to a user (not shown) operating client 100. The user may "click" on an icon displayed by web browser 200. Alternatively, the user may use web browser 200 to navigate to a particular web page provided by web server 304. In response to the user's actions, client 100 makes an HTTP request via network interface 208 across network 104 to host system 108. Alternatively, client 100 may use a proxy to make an HTTP request to host system 108. Upon receiving the HTTP request, host system 108 may request additional information from the user. A user at client 100 may be prompted by host system 108 to provide login information, such as a user name and password. Other preliminary communications and interactions are consistent with the principles of the present invention.

Once client 100 has contacted host system 108, processing flows to step 402 where client 100 requests a launch page from host system 108. Host system 108 provides the launch page across network 104 to client 100. The launch page may comprise multiple frames of content and program code from various sources such as hosting server 300, application server 302, and web server 304. Some of the frames may include static content such as navigation links, branding information, etc. which are provided by web server 304 and/or application server 302.

In addition, when delivering the launch page, host system 108 may provide several parameters to client 100. For example, host system 108 may deliver parameters such as: a unique identifier for the user requesting the application; an authentication identifier for authorizing the user to request and execute the application; a name of a provider implementing the application; an Internet protocol address for hosting server 300; a port number on which hosting server 300 listens for connection requests; a type of console to be provided to the user via web browser 200 for the application; version and edition information for the application; a name of a product to be displayed to the user; and a name of the provider to be displayed to the user.

In step 404, client 100 executes program code provided within the launch page to conduct an initial check to determine whether web browser 200 can support JavaScript for the application. For example, if web browser 200 is unable to support JavaScript then web browser 200 may image the HTML text between "<noscript>" and "</noscript>" tags. Client 100 may also determine other parameters in addition to JavaScript support as part of the initial check in accordance with the principles of the present invention. If client 100 cannot support JavaScript, then processing flows to step 406.

In step 406, client 100 reports an error to the user since web browser 200 cannot support JavaScript for the application. For example, web browser 200 may display an error message, e.g., the HTML tag "<NOSCRIPT>Error: JavaScript not supported." In addition, client 100 may provide detailed reasons for the error such as JavaScript not supported or the user has set security setting limitations. Other types of error messages, as well as diagnostics for how to remove the in place limitations are in accordance with the principles of the present invention.

If client 100 can support program code for web browser 200, e.g., JavaScript (step 404), then processing continues to step 408 where client 100 executes additional program code, e.g., JavaScript in the launch page from application server 302 and/or web server 304, to determine whether web browser 200 can safely run other program code, e.g., Java for the application. To check for safe operation, client 100 may determine, e.g., whether Java is enabled for web browser 200, version information, and browser type for web browser 200. In addition, client 100 may test the network path across network 104 to host system 108 to determine whether an intervening device, such as a firewall, will interfere and/or prevent Java execution on web browser 200 by checking, for example, whether a test applet was able to download and run on client 100. However, client 100 may consider a wide variety of factors to determine whether web browser 200 can safely run Java. If web browser 200 cannot safely execute Java, then processing flows to step 410.

In step 410, client 100 reports an error to the user by displaying an error page. Client 100 may request the error page from host system 108. The error page may include program code, e.g., JavaScript, to be executed on client 100 to determine why Java cannot safely run on client 100. The error page may also display overall result (e.g., "pass", "fail", "warn") of the tests performed and an itemized summary of each test performed and a result of each test. The error page may also include details explaining reasons for the result. Alternatively, the error page may provide information for correcting the failed test.

If client 100 can safely execute Java, then processing continues to step 412 where client 100 runs JavaScript and Java program code provided in the launch page to probe for a connection to hosting server 300 within host system 108 and further examine client 100 execution environment. Client 100 may run JavaScript within the launch page to write applet 204 on to the launch page, and download additional Java code from host system 108. To probe for a connection, client 100 may refer to parameters previously supplied in the launch page from host system 108. For example, client 100 may probe for a connection to hosting server 300 by: attempting a direct connection with hosting server 300 at a designated port and address provided in the launch page; attempting an HTTP request to hosting server 300 at a particular port; and attempting to discover a URL of a service accessible via web server 304 that can forward, e.g., at port 80, requests to hosting server 300. If client 100 cannot successfully probe host system 108, then processing flows to step 414.

In addition, since client 100 can safely run Java, client 100 may run Java within the launch page to discover further parameters for the execution environment. For example, client 100 may discover the build number for the Java virtual machine, plug-ins installed, versions of installed plug-ins, and any previously installed files for the application. Other parameters which may be discovered by running Java are within the principles of the present invention.

In step 414, client 100 reports an error to the user, e.g., by displaying an error page. The error page may include program code, e.g., JavaScript which is executed on client 100 to determine/report reasons why the probe to host system 108 was not successful. The error page may also display an overall result of the tests performed, an itemized summary of each test performed and a result of each test, and any corrective measures that may be appropriate.

If client 100 can successfully probe host system 108 to establish communications with hosting server 300, then processing continues to step 416 where client 100 requests application content and program code from hosting server 300 and gathers additional parameters for the application. Client 100 and hosting server 300 may communicate in several ways such as: using a direct connection with hosting server 300 at a designated port and address provided in the launch page; sending an HTTP request directly to hosting server 300 at a particular port; using a URL of a service accessible via web server 304 that can forward requests to hosting server 300. Hosting server 300 may update the launch page to provide additional content and program code to client 100 for running the application. For example, client 100 may discover information about the configuration of hosting server 300 such as whether IP audio for the application should be enabled. Other parameters for hosting server 300 may also be provided to client 100 at various times in accordance with the principles of the present invention.

In addition, the launch page may be updated to include program code, e.g., JavaScript and Java, for execution on client 100 to continue discovering parameters for the execution environment. Upon executing the program code, client 100 may discover parameters such as: the hardware configuration of client 100; the operating system of client 100; the web browser environment; the network path between client 100 and hosting server 300; the security policies enforced; and the user's characteristics. For example, client 100 may run Java and/or JavaScript to discover display size used, security settings, and results from communications requests, such as HTTP requests. Client 100 may then gather the parameters discovered about the execution environment and parameters previously provided from host system 108 into a request. Client 100 sends the request to host system 108, e.g., hosting server 300. Hosting server 300 confirms the parameters gathered by client 100 and may then make one or more decisions for adjusting the configuration and settings of the application. For example, hosting server 300 may select a particular application console size based upon the display size discovered by client 100. Alternatively, hosting server 300 may provide program code for a variety of application parameters such as application console size which are then selected by client 100. Also, hosting server 300 may enable IP audio for the application based upon plug-ins discovered by client 100. Hosting server 300 then may update the launch page to provide content and program code to client 100 for configuring the application and adjusting application settings.

In step 418, client 100 receives the updated launch page and determines whether the application configuration and settings will be successful. For example, client 100 may consider the following in determining whether the application configuration and settings will be successful:

the hardware configuration of client 100, including processor type and speed, memory size, display size, input devices, and other peripheral devices;

the operating system of client 100, e.g., Windows, Macintosh, or UNIX;

the web browser environment including manufacturer, version, plugins, optional features, and user settings;

the network path between client 100 and hosting server 300, including available bandwidth, delay, jitter, networking protocols, application proxies, network elements (e.g., routers, switches, and hubs), firewalls and other network security devices;

security policies enforced, such as, by intermediate network elements, security devices, browser settings, and the operating system; and user characteristics, including the user's role, identity, department, history of use of the application, and history of use of related applications.

However, any of a wide variety parameters may be considered by client 100 to determine whether the application configuration and setting will be successful, in accordance with the principles of the present invention.

If the client 100 determines that the application will not be successful, then processing flows to step 420 where client 100 may report one or more warnings to the user, e.g., by displaying a warning page. In operation, web browser 200 within client 100 may display a warning page and suggest actions such as: downloading one or more plug-ins; downloading an updated version of the web browser; or adjusting media interface parameters, such as display resolution. However, any of a wide variety of warnings and/or suggestions may be provided to the user in accordance with the principles of the present invention. In step 422, client 100 using, e.g., web browser 200 then displays a message, e.g., using a dialog window, allowing the user to manually order continuing with execution of the application.

If client 100 determines that the application configuration and settings will be fully successful, then processing continues to step 424 where client 100 automatically continues with the application. For example, web browser 200 within client 100 may automatically an application console for the application. In addition, web browser 200 may initiate applets in addition to applet 204 to modify the settings within client 100 and/or modify settings within media interface 202, and modify settings within network interface 208. Accordingly, client 100 may then run the application based upon the configuration information which has been tailored for the particular execution environment of client 100.

Although specific components have been described, one skilled in the art will also appreciate that the methods and apparatus consistent with the present invention may contain additional or different components. Other embodiments and modifications of the invention will be apparent to those skilled in the art from consideration of the specification and practice of the invention disclosed herein. For example, JSP, Perl, C/C++, ASP, and ActiveX may be used in accordance with the principles of the present invention. It is intended that the specification and examples be considered as exemplary only, with a true scope and spirit of the invention being indicated by the following claims.

What is claimed is:

1. A method in a client of launching a software component, the client having an execution environment, the method comprising:

receiving from a user a request to launch the software component;

sending to a server a request to launch the software component;

in response to sending the request, receiving from the server a launch page that includes code to determine whether the software component can successfully execute in the execution environment of the client, to determine parameters of the execution environment of the client, and to request downloading of the software component configured based on the determined parameters;

under control of the code of the received launch page,
determining whether the software component can successfully execute in the execution environment of the client;
when it is determined that the software component cannot successfully execute in the execution environment of the client, reporting an error to the user;
when it is determined that the software component can successfully execute in the execution environment of the client, determining parameters of the execution environment of the client;

sending to the server a request to download the software component, the request indicating the determined parameters;
receiving from the server the software component configured according to the determined parameters; and
launching execution of the software component;

updating the received launch page to include code to continue to detect parameters of the execution environment of the client; and under control of the updated launch page,
detecting changes in a parameter of the execution environment of the client; and
when a change in a parameter is detected, notifying the server of the change to the parameter so that the server can effect the re-configuring of the software component.

2. The method of claim 1 wherein the determining of whether the software component can successfully execute in the execution environment of the client includes determining whether a certain scripting language is supported.

3. The method of claim 1 wherein the determining of whether the software component can successfully execute in the execution environment of the client includes determining whether the software component can be downloaded from the server.

4. The method of claim 3 wherein the determining of whether the software component can be downloaded includes attempting to download from the server a test component.

5. The method of claim 1 wherein the determining of whether the software component can successfully execute in the execution environment of the client includes determining whether a browser is enabled to execute code in a certain language.

6. The method of claim 1 including when it is determined that the software component can successfully execute in the execution environment of the client, establishing a connection between the client and the server.

7. The method of claim 1 including after sending to the server a request to download the software component, receiving from the server application content.

8. The method of claim 1 wherein a parameter of the execution environment of the client indicates whether a browser has certain plug-ins.

9. The method of claim 1 wherein a parameter of the execution environment of the client relates to a security policy of the client.

10. The method of claim 1 wherein a parameter of the execution environment of the client relates to a hardware configuration of the client.

11. A method in a server for downloading a software component to a client, the client having an execution environment, the method comprising:

receiving from the client a request to launch the software component;

in response to receiving the request, sending to the client a launch page that includes code to:
determine whether the software component can successfully execute in the execution environment of the client, wherein the software component can successfully execute in the execution environment of the client when a certain scripting language is supported on the client,
determine parameters of the execution environment of the client, and
request downloading of the software component configured based on the determined parameters; and after the code executing at the client determines that the software component can successfully execute in the execution environment of the client, receiving from the client a request to download the software component, the request indicating parameters determined by the code;

configuring the software component according to the determined parameters; and sending to the client the configured software component.

12. The method of claim 11 wherein the software component can successfully execute in the execution environment of the client when the software component can be downloaded from the server.

13. The method of claim 12 wherein the software component can be downloaded when a test component can be downloaded from the server.

14. The method of claim 11 wherein the software component can successfully execute in the execution environment of the client when a browser is enabled to execute code in a certain language.

15. The method of claim 11 wherein the code establishes a connection between the client and the server when it is determined that the software component can successfully execute in the execution environment of the client.

16. The method of claim 11 including after receiving the request to download the software component, sending application content to the client.

17. The method of claim 11 including after sending to the client the software component configured according to the determined parameters, receiving a notification from the client of a change to a parameter and effecting reconfiguration of the software component based on the changed parameter.

* * * * *

UNITED STATES PATENT AND TRADEMARK OFFICE
CERTIFICATE OF CORRECTION

PATENT NO. : 7,665,082 B2  Page 1 of 1
APPLICATION NO. : 09/893749
DATED : February 16, 2010
INVENTOR(S) : Wyatt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1508 days.

Signed and Sealed this

Seventh Day of December, 2010

David J. Kappos
*Director of the United States Patent and Trademark Office*